United States Patent [19]
Arias

[11] Patent Number: 5,618,641
[45] Date of Patent: Apr. 8, 1997

[54] BIPOLAR BATTERY CONSTRUCTION

[75] Inventor: Jeffrey L. Arias, Downey, Calif.

[73] Assignee: Bipolar Power Corporation, Whittier, Calif.

[21] Appl. No.: 161,970

[22] Filed: Dec. 3, 1993

[51] Int. Cl.$^6$ ....................................................... H01M 2/22
[52] U.S. Cl. ............................ 429/210; 429/66; 29/623.2
[58] Field of Search ............................ 429/210, 66, 204, 429/54, 152, 159; 29/623.2

[56] References Cited

U.S. PATENT DOCUMENTS

| | | | |
|---|---|---|---|
| 4,336,314 | 6/1982 | Yonezu et al. | 429/66 |
| 4,729,933 | 3/1988 | Oswald . | |
| 5,288,566 | 2/1994 | Ginatta et al. | 429/210 |
| 5,409,787 | 4/1995 | Blanyer et al. | 429/66 |

FOREIGN PATENT DOCUMENTS

| | | |
|---|---|---|
| 3040018 | 7/1982 | Germany . |
| 58-172874 | 10/1983 | Japan . |
| 59-148275 | 8/1984 | Japan . |
| 0473863 | 3/1992 | Japan . |
| 4138658 | 5/1992 | Japan . |
| 5299094 | 11/1993 | Japan . |

OTHER PUBLICATIONS

"Separators for Absorbed Electrolyte Recombinant Batteries," by Wandzy et al., as presented at the 48th IBMA Convention, Oct. 1985, The Battery Man, Jul. 1986.

"Structure of Lead Acid Batteries Adjusted to Fast Charge," by Alzieu et al., The Fifth International Electric Vihicle Symposium, Philadelphia 2–5 Oct. 1978 EVS–5.

"Hovosorb Recombinant Battery Separator Background . . ." by Wandzy of Hollingsworth & Vose Company, East Walpole, MA, Mar. 18, 1987, pp. 1–3.

*Primary Examiner*—George Fourson
*Assistant Examiner*—C. Everhart
*Attorney, Agent, or Firm*—Fish & Richardson, P.C.

[57] ABSTRACT

The *Bipolar Battery Construction* disclosed and claimed above solves the problem of constructing a bipolar battery (11,12) with a desired, uniform, constant, pressure between each bipolar plate (20) and separator (30) in the battery cell stack (48). The provision of such a pressure dramatically increases battery life, and increases the power of the cell stack (48). Compressive force is provided by spring-loaded clamping internal to the battery (11,12). A sealed battery case (52) provides common confinement of gases and vapors from all cells (58), minimizing battery sealing requirements. An inhibitor device (80,81) is provided for minimizing or eliminating leakage current between adjacent battery cells (58) through electrolyte (32), avoiding self-discharge of the cells (58). Insulation (54) minimize temperature gradients in the cell stack (48) which assures uniform and stable performance.

17 Claims, 11 Drawing Sheets

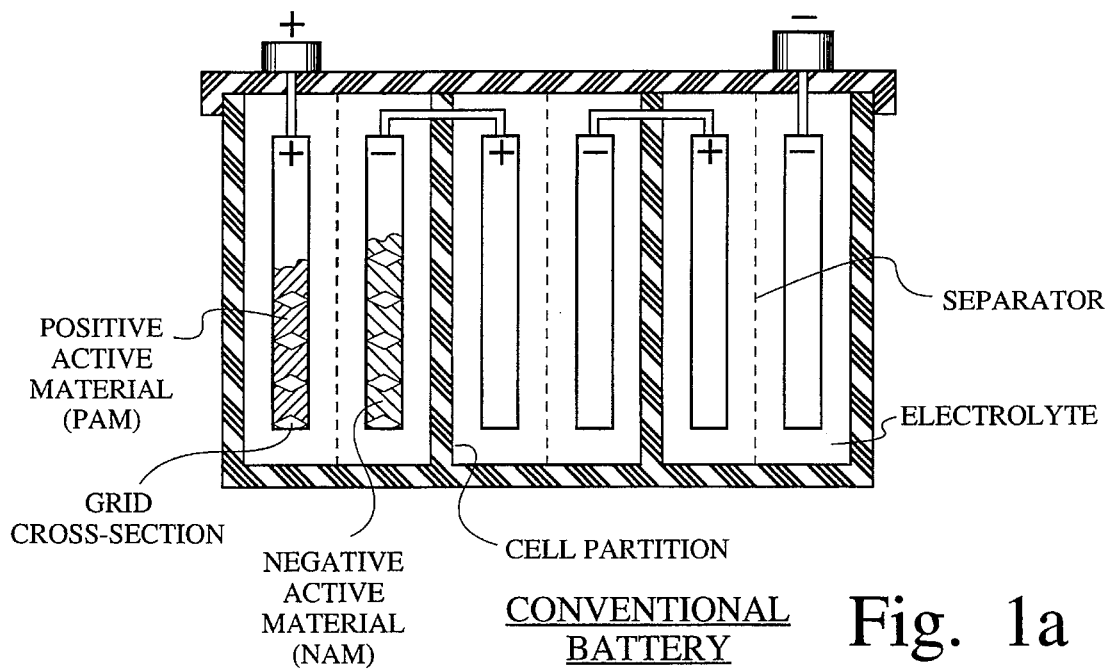
Fig. 1a CONVENTIONAL BATTERY
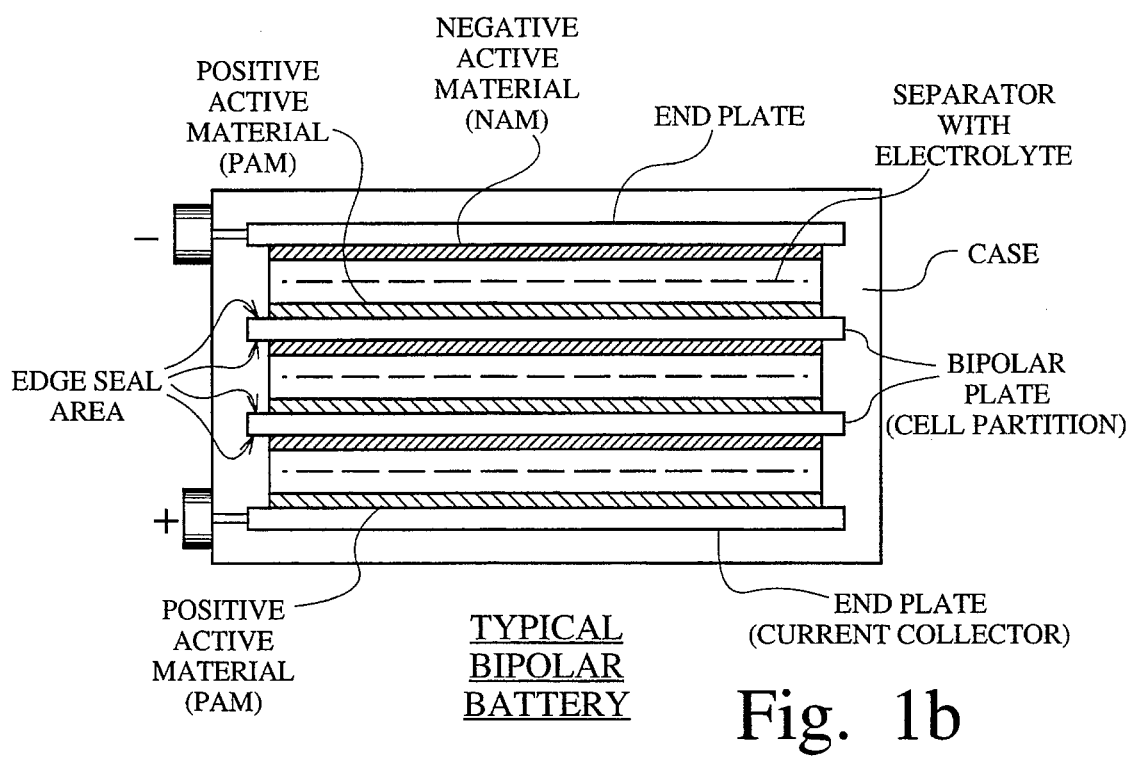
Fig. 1b TYPICAL BIPOLAR BATTERY

SECTION A-A

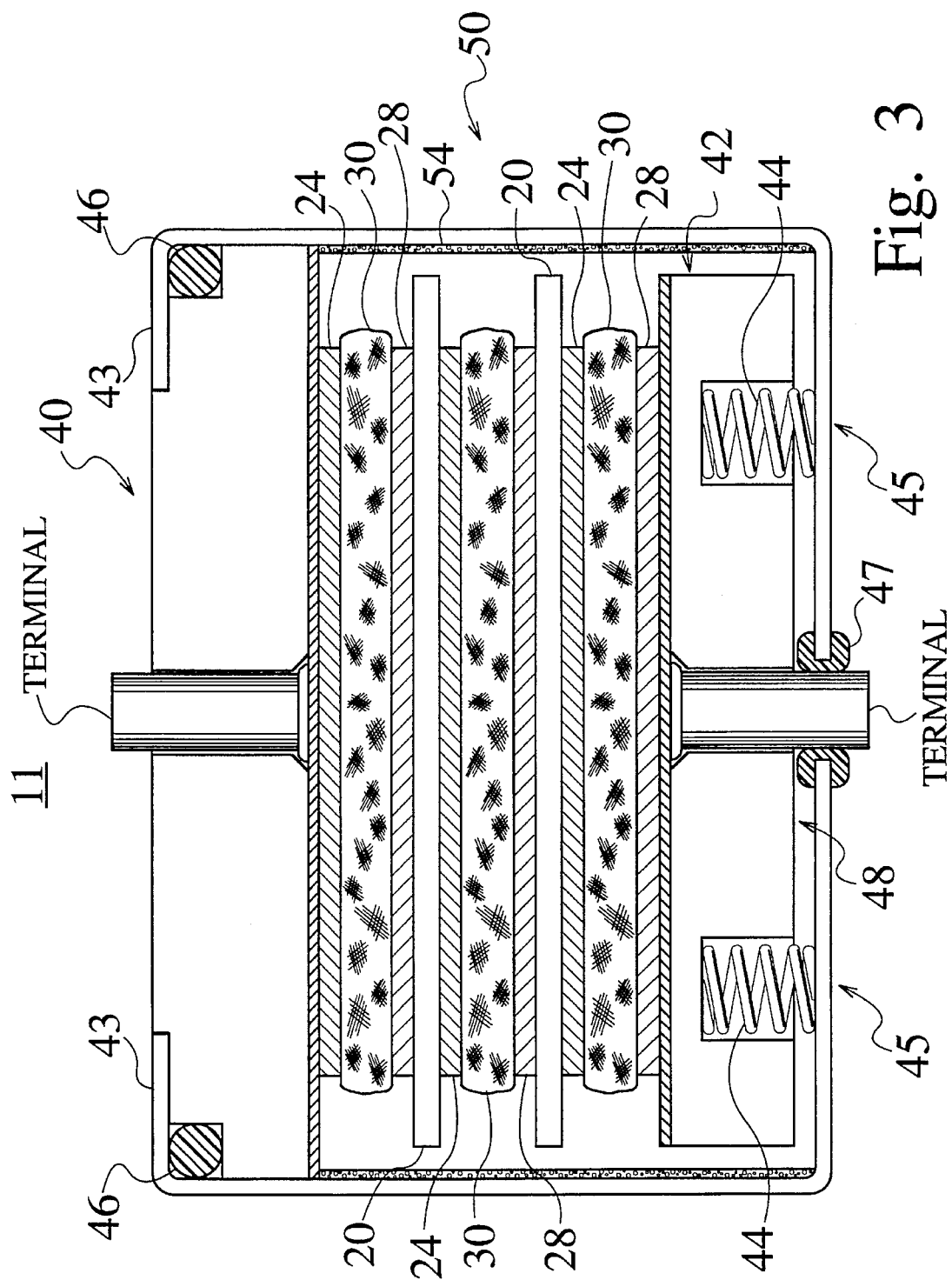

SECTION B-B

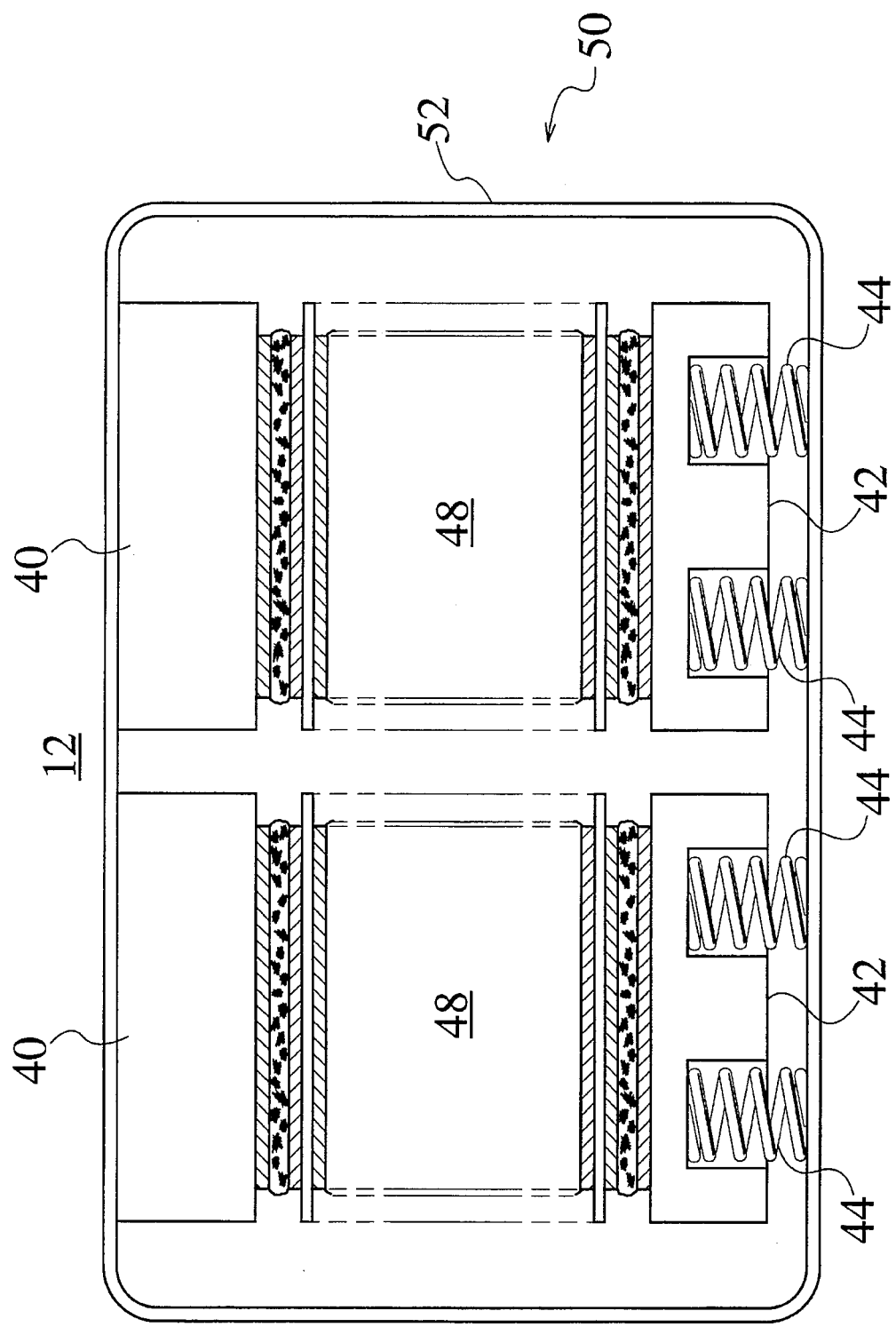

BIPOLAR BATTERY CONSTRUCTION

FIELD OF THE INVENTION

The present invention relates to the field of sealed bipolar batteries generally and, more specifically, to the construction of novel bipolar battery cell stacks/for use in sealed bipolar lead-acid batteries.

CROSS-REFERENCE TO A RELATED PATENT APPLICATION

The present application is related to three commonly-owned and commonly assigned applications: U.S. Ser. No. 07/932,521, U.S. Pat. No. 5,334,464 entitled Lightweight Battery Plates filed on 20 Aug. 1992; U.S. Ser. No. 08/096,118, abandoned entitled Battery Plates with Lightweight Cores, filed on 22 Jul. 1993; and U.S. Ser. No. 08/096,676, U.S. Pat. No. 5,368,960 entitled Improved Utilization Efficiencies By Using High Sulfate Starting Materials, filed on 23 Jul. 1993.

BACKGROUND OF THE INVENTION

Conventional lead-acid batteries such as the one depicted in FIG. 1a, comprise a series of separate (monopolar) positive and negative electrodes, connected in a combined series and parallel arrangement to achieve the voltage and current desired. Each electrode of this battery consists of a separate grid containing either the positive or negative active material which is suspended in an electrolyte. Cells are generally isolated from each other by partitions in the battery case. Insulating separators are used to keep the grids from touching.

The bipolar battery is fundamentally different from the conventional battery described above. The bipolar battery, depicted in FIG. 1b, is constructed of a series of bipolar battery plates, or biplates, which are solid sheets of material that have negative active material (NAM) on one side and positive active material (PAM) on the other side. The biplates partition the battery into cells and provide an electrical path between the NAM and PAM of adjacent cells. The biplates are separated by a separator, usually a glass mat material, in which the electrolyte is absorbed. The electrical current passes only through the thin biplates, perpendicular to the plane of the plates. This presents a very short distance and a very large cross-sectional area through which the current passes compared to the conventional lead-acid battery. Conventional batteries are characterized by a long electrical path between cells and a small electrical cross-section of the grid. As a result, the bipolar battery has almost no intra-cell resistance and about one-fifth the overall electrical resistance of conventional batteries. This reduction in resistance makes possible a high power battery that may be used to propel electric automobiles, provided that sufficiently long life, light weight and affordable construction cost can also be achieved.

Prior bipolar batteries have utilized biplates which are sealed at the edges by "edge seals", such as those illustrated in FIGS. 1c, 2a and 2b. These seals have three purposes:
1. Preventing the escape of water vapor and hydrogen or oxygen gas. This escape will cause the degradation of the battery due to loss of water from the electrolyte;
2. Preventing liquid electrolyte from bridging between adjacent cells, thereby creating a leakage current between them resulting in self-discharge of cells; and
3. Maintaining a predetermined spacing between biplates, which in turn, determines the amount of pressure, compression, or "crush" on the separator.

For decades, various methods of overcoming edge seal leakage have been attempted. These attempts have included the use of various adhesives and sealants, the "welding" of plastic joints or case materials around the plates, or the use of elastomeric seals under compression. Some of these approaches have resulted in outright failures. Some seals have been used to make serviceable batteries for a period of time. None, however, appear to have overcome the problems completely. A previous, rigid plastic edge seal is illustrated in FIG. 1c. This type of seal has these inherent problems:
1. The performance of the battery is dependent on obtaining and maintaining a very large number of gas-tight seals in each battery which has proved difficult to achieve in production;
2. The assembly time of this type of seal contributes substantially to the overall cost of producing the battery;
3. Although the edge seal can provide a means of physically spacing the bipolar plates, the optimum battery performance is achieved by maintaining a uniform separator pressure, not a uniform spacing, between the bipolar plate and the separator, which this type of seal does not allow;
4. With this type of edge seal, shrinkage of the negative active material, the expansion of the positive active material and the relaxation of the separator cause dimensional changes which can not be compensated. Under these conditions, the compression force on the separator cannot be controlled;
5. Forces at the joints resulting from separator compression, internal gas pressure, PAM expansion or NAM shrinkage continually "pry" apart and loosen this type of seal and thus allow leakage of electrolyte and gases;
6. All joints must be gas tight for the life of the battery; because there may be more than 300 feet of joints in a battery, the reliability of the manufactured battery is poor; and
7. In addition to maintaining the edge seals, each cell must have a vent for escape of gases and vapors during battery formation (initial charging) or abusive charging. Each cell must also be capable of being filled with electrolyte, which is cumbersome.

Edge seals, such as those illustrated in FIG. 1c, 2a, and 2b, are made rigid, usually of plastic, to seal tightly against the gas vapor pressure in the cell. These kinds of seals hold the biplates apart and thus prevent a high clamping pressure from being applied to the separator. High clamping pressure applied to the separator has been shown to be advantageous to battery performance in conventional monopolar batteries.

Shrinkage of the negative active material or expansion of the positive active material during charging, and/or subsequent relaxation of the separator compression, also require the biplate spacing to change to maintain a constant compressive force against the glass mat separator. Expansion of active materials and/or grids within conventional lead-acid batteries can be a significant problem, because sufficient expansion can occur during the life of the battery which ruptures or splits the sides of the plastic battery case. In some prior bipolar batteries, maintaining the proper pressure on the separator and venting of the cell has been achieved by using a flexible elastomeric seal between the cells such as that illustrated in FIGS. 2a and 2b. This type of seal requires bipolar cell stacks to be manually adjusted during the fabrication process. Sometimes adjustment is necessary even after the battery is manufactured and is achieved by periodically tightening bolts holding the cell stack together.

Without this adjustment, the loss of separator compression results in loss of battery performance. These tedious assembly steps are uneconomic and impractical for producing batteries at high rates.

The optimum compressive force on the separator, and thus the required clamping pressure on the cell stack that achieves the optimum battery life and power, has been found experimentally to range from about 7 to 20 pounds per square inch. Table 1 presents some experimental results showing the battery life and power benefits which can be achieved with a high and constant compressive force between biplate and separator.

TABLE 1

|  | "Standard" Compression | "High" Compression | % Increase |
|---|---|---|---|
| Life (cycles) | 500–800 | 1635 | 100–227 |
| Power (W/cm$^2$) | 1.68 | 1.84 | 10 |

The data presented in Table 1 show that, in addition to controlling the spacing of biplates and accommodating any paste shrinkage and/or separator relaxation, the application of high pressure against the battery cell stack can impart a dramatic increase in battery life and a substantial increase in battery power.

The life-enhancing benefits of high separator pressure are the result of maintaining high pressure on the positive active material. The life of this electrode increases apparently when good particle-to-particle contact in the PAM is maintained. This can be seen indirectly by the increased life of batteries which use "tubular" rather than "flat plate" (grid type) positive plates. In the tubular positive plate, the active material is confined inside a strong, porous tube, usually made of woven fiberglass. Thus, as the material expands within a confined space, the particle-to-particle pressure continually increases, even to the point of rupturing the tube. Other attempts to increase battery life by confining materials expansion include various arrangements of clamps on the battery exterior including metal straps or "banding", and "cages" with plates and bolts. All these methods, however, rely on expansion of materials to generate and/or maintain an increased pressure on the PAM. The only method by which the pressure can be controlled and predicted, while accommodating all the variations of material expansion and contraction and gas pressure within a cell, is to apply a known and constant mechanical force. The benefits of high particle-to-particle pressure were shown directly in the results presented in a paper by J. Alzieu, B. Geoffrion, N. Lecause and J. Robert of Laboratoire deégnie Electrique des Universites Paris VI, at the Fifth International Electric Vehicle Symposium, Philadelphia, Pa., 2–5 Oct. 1978. This data showed that by applying a spring loading that was equivalent to fifteen pounds per square inch against the grids and separators of conventional monopolar batteries, a dramatic increase in battery cycle life could be achieved. However, the use of a spring-loaded cell stack in bipolar batteries has not been used previously because it requires an edge seal that offers little or no resistance to compression to transfer the compressive load to the separator, a condition at odds with using a rigid edge seal. Gas pressure within the cell can offset a significant portion of spring pressure. Also, the tensile loads on the battery case can become excessive for plastic materials which creep or slowly stretch, especially at higher temperatures. An electrode measuring seven inches by eight inches under a compression of fifteen pounds per square inch is subjected to an applied force of over 1000 pounds. This force must be carried as a tensile load through the thin plastic walls of a conventional battery case. If the plastic case stretches or "creeps", a constant force on the separator cannot be reliably maintained simply by pre-compressing the separator to a desired pressure. A positive means of applying a known pressure on the separator over a long period of time which allows for changing internal cell dimensions and gas pressure is required. One known means of applying pressure is an external mechanical arrangement for applying a spring force on the cell stack. Unfortunately, this usually increases battery size, weight and cost significantly. Applying the load externally to the battery as in the experiments of J. Alzieu, et al., and illustrated in FIG. 2 of their paper, adds impractical and unacceptable mechanical protuberances to the battery.

The use of springs within a battery is generally not viewed with favor by the battery industry because of the corrosion of the spring material and possible contamination of the electrolyte or negative electrode by metals, particularly iron. It is generally believed that acid "vapor" will reach the spring and quickly cause corrosion. Actual experiments in the construction of sealed bipolar lead-acid batteries using springs, however, show that only water vapor circulates within the battery. Little or no corrosion occurred in experiments lasting several months. Acid "creep" or wicking may eventually allow acid to reach the spring and thus initiate corrosion, however, spring coatings can prevent this.

There has frequently been concern in the battery industry regarding the use of commonly-connected cells wherein the vapors and gases are free to circulate between cells. This is partly due to the initial commercial failure of the "Torque-Starter™" battery, the first commonly-manifolded battery. The successful introduction of the "Optima™" battery, which uses commonly-manifolded cell, has demonstrated that commonly-connected cells are feasible.

The development of a practical method and apparatus which would provide the desired uniform, constant, high compressive force between the bipolar plates and separators in the cell stacks would constitute a major technological advance. The improved battery performance and longer useful life of batteries that could be obtained using such an innovative device would satisfy a long felt need within the battery industry in general and in the sealed lead acid battery industry in particular.

SUMMARY OF THE INVENTION

The *Bipolar Battery Construction* apparatus disclosed and claimed in this patent application solves the problem of constructing a bipolar battery with a desired uniform, constant, high compressive force between each bipolar plate and separator in the cell stack. The present invention provides this compressive force by means of a spring-loaded clamping device internal to the battery. The provision of a uniform, high compressive force by means of the spring-loaded clamping device dramatically increases lead-acid battery life, and substantially increases the power of the battery stack by maintaining optimum pressure between the bipolar plates in each bipolar cell. The invention provides a method of construction for sealing liquids and gases inside the battery. Evolved gases are tree to circulate within a common sealed battery case and to recombine into water. The invention also provides means for minimizing or eliminating electrolyte "creep" between adjacent bipolar battery cells, thus minimizing or eliminating current leakage between cells. The present invention alternatively incorporates a "creep" inhibitor device which minimizes or prevents electrolyte from creeping or wicking along the surface of a bipolar plate and into an adjacent bipolar cell. In this way, self-discharge of cells because of high leakage current between the negative active material and the positive active material deposited on the bipolar plate is minimized or eliminated.

Experiments have shown that the self-discharge rate due to electrolyte "wicking" paths around biplate edges is sufficiently low as to have a useful battery for some applications. This is true even for readily-corroded lead biplates. The self-discharge rate can be reduced further by using corrosion-resistant biplate materials, hydrophobic borders on the bipolar plates, and/or electrolyte dams to minimize wicking around bipolar plate peripheral edges.

One of the preferred embodiments of the present invention includes a layer of tantalum, vapor-deposited on the positive side of each bipolar plate and projecting beyond the active material layers to the peripheral edges. The tantalum surface is liquid-repelling and, therefore, will not "wick" electrolyte. In addition, any electrolyte which seeps from the separator will not wet the surface but instead will form droplets which roll off the surface. Zirconium may be used in place of tantalum, but is not as effective as tantalum. Zirconium, however, can be used on both positive and negative sides of a bipolar plate. Alternative embodiments of this surface treatment may utilize liquid-repellant coatings of other so-called "hydrophobic" materials. Among hydrophobic materials are flouropolymers such as Teflon™, wax, polyethylene and glassy metal oxides.

Additional alternative embodiments of "creep" inhibitor devices include various configurations of an electrolyte dam which contains any excess electrolyte and prevents it from creeping or flowing between any two adjacent bipolar cells. The electrolyte dam is affixed to the peripheral edges of at least one surface of each bipolar plate. The dam may simply be an upturned flange on the peripheral edges of the bipolar plate. The dam may also be a flexible, hydrophobic sponge arranged around the peripheral edges of each bipolar plate. The dam may alternatively be composed of a continuous rim or flexible, hydrophobic bead which is disposed around the peripheral edges of each bipolar plate.

In the present invention, assembly of the battery stack is accomplished using rigid plates at each end of the bipolar cell stack which are spring-loaded to apply a uniform, constant, high compression to the separator. Positive active material (PAM) or negative active material (NAM) dimensional changes during the initial formation charge, or subsequent relaxation of the separator, is automatically compensated by the constant loading of the springs. The result of achieving uniform, constant, high separator compression is dramatically increased battery life, more reliable battery performance over the battery life and substantially increased battery power. Use of spring-loaded plates eliminates the need for manual adjustment of the pressure on the battery stack, obviating the need for labor and increasing the assembly speed, both of which result in a lower production cost. Mechanical arrangements for applying the spring force without a significant increase in the size or weight of bipolar batteries are made possible by the invention.

An appreciation of other aims and objectives of the present invention and a more complete and comprehensive understanding of this invention may be achieved by studying the following description of a preferred embodiment and by referring to the accompanying drawings.

A BRIEF DESCRIPTION OF THE DRAWINGS

FIG. 1a is a schematic cross-sectional view of a conventional lead acid battery.

FIG. 1b is a schematic cross-sectional view of a conventional bipolar lead-acid battery.

FIG. 3 is a schematic cross-sectional view of a preferred embodiment of a bipolar battery using *Bipolar Battery Construction* methods, showing a single battery stack and a method of applying compression to the bipolar battery cells with springs to produce a uniform, constant, high pressure between the bipolar plate and the separator.

FIG. 4b is a schematic cross-sectional view B—B of the Multi-Cell Battery using *Bipolar Battery Construction* depicted in FIG. 4a.

FIG. 5a is a schematic cross-sectional view of the Multi-Cell Battery using *Bipolar Battery Construction* depicted in FIG. 4a. FIG. 5a shows an alternate method for providing uniform, high pressure to the bipolar battery stacks using coil springs.

Figure 1C:
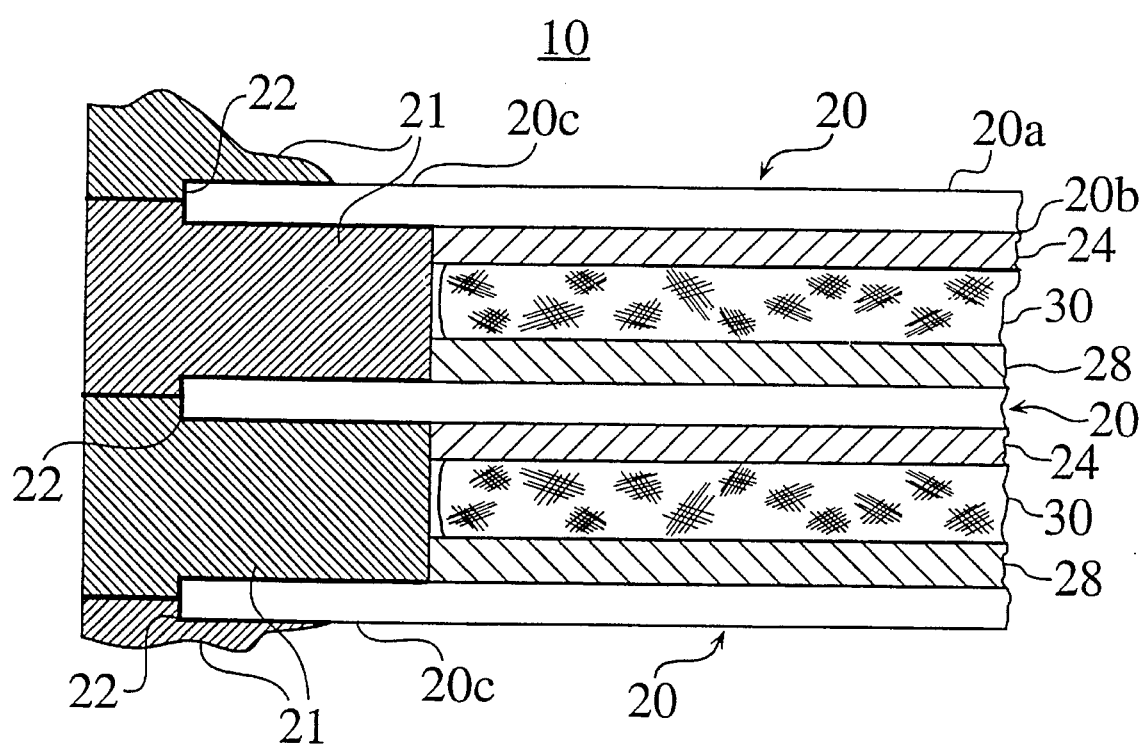
FIG. 1c is a schematic cross-sectional view of a portion of a conventional bipolar lead-acid battery showing a conventional, rigid edge seal.

FIGS. 8, 9, 10a, 10b, and 11 are schematic cross-sectional views of a portion of a bipolar cell, depicting some of the basic alternative embodiments of an electrolyte dam used in *Bipolar Battery Construction* where excess electrolyte must be contained.

A DETAILED DESCRIPTION OF A PREFERRED EMBODIMENT

FIGS. 1a, 1b, 1c, 2a and 2b are discussed above in the Background section. A further discussion of FIGS. 1c, 2a and 2b will aid in understanding the problem which the present invention solves. In this specification, the terms "upper" and "lower" are used only to describe relative locations in the drawings and are not intended to delineate or limit the orientation of any element of the invention. The figures which accompany this specification are not drawn to scale. In particular, the thicknesses of bipolar plates and coatings deposited on them are drawn greater than actual scale to show these features more clearly.

FIG. 1c presents a schematic cross-sectional view of a portion of a conventional bipolar lead-acid battery with bipolar plates 20, each having an upper surface 20a and a lower surface 20b, and layers of negative active material (NAM) 24, separators with electrolyte 30, and positive active material (PAM) 28. FIG. 1c also shows a conventional, rigid edge seal 21. The bipolar plate edges 20c are embedded in rigid plastic 21. The seal joint margin 22 where the bipolar plate 20 and the plastic edge seal 21 are joined is sealed gas-tight with an adhesive. In one of the preferred embodiments, the adhesive is an epoxy. As an alternative, the bipolar plate 20 and the plastic edge seal 21 may be welded, as an example, using ultrasonic welding techniques. For the battery cell 10 to function properly, there must be a compressive force between the bipolar plate 20 and the separator 30 exceeding some minimum force. The entire sealed bipolar cell 10 must be under an initial compressive force. Separator 30 compression tends to force the seal joint margin 22 apart, allowing leaks of electrolyte 32, water vapor, hydrogen and oxygen gas. The seal joint margin 22 is a critical failure point because it is exposed to acid (electrolyte 32) and has sufficient electrical potential to cause oxidation. If shrinkage or relaxation of the separator occurs, the compressive force is reduced. The reduction in compression can reduce cell function and result in cell failure.

Figure 2A:
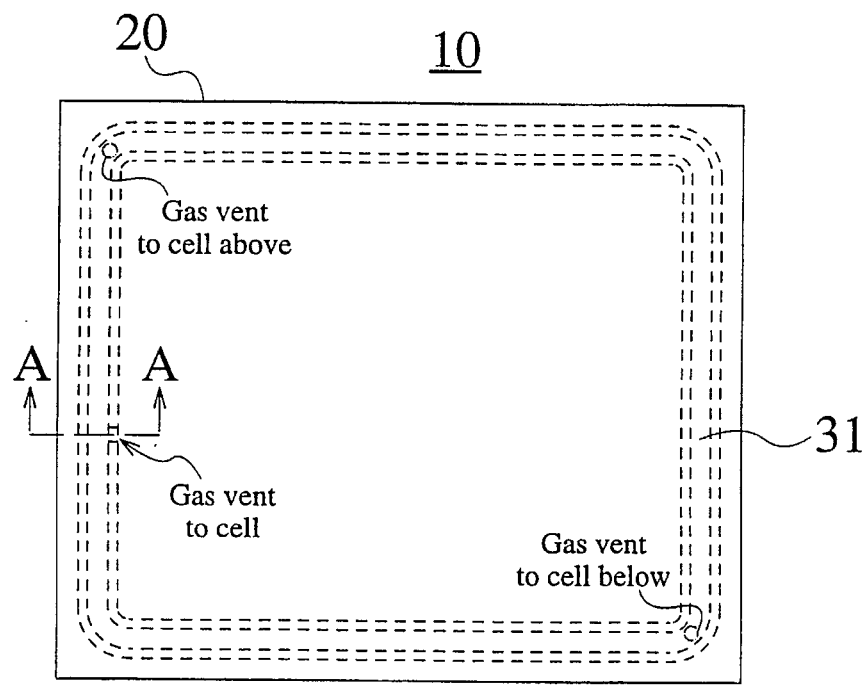
FIG. 2a is a schematic plan view of a bipolar battery cell which has an elastomeric seal for preventing the escape of electrolyte from the cell.
Figure 2B:
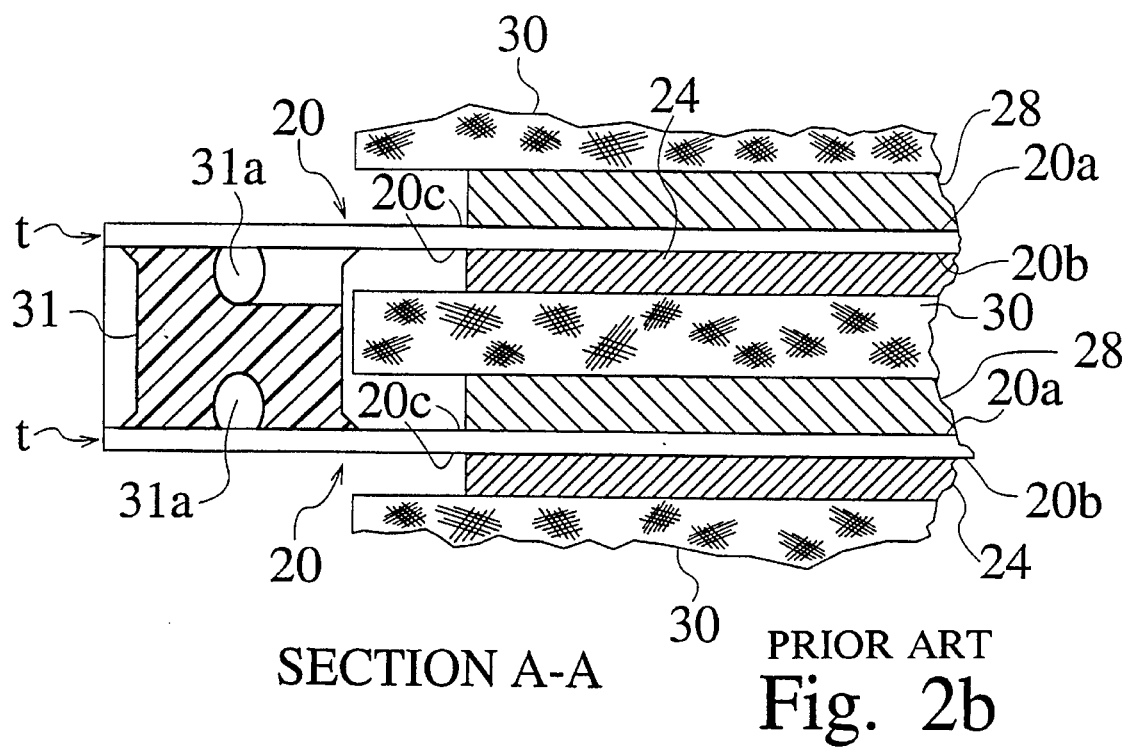
FIG. 2b is a schematic cross-sectional view A—A of a bipolar battery cell which has an elastomeric seal for preventing the escape of electrolyte from the cell.

FIG. 2a presents a schematic plan view of a conventional, sealed bipolar battery cell 10, with bipolar plates 20, sealed with an elastomeric edge seal 31. Section A—A of FIG. 2a is depicted in FIG. 2b as a schematic cross-sectional view of a sealed bipolar cell 10. In FIG. 2b, two bipolar plates 20 with thickness t are shown which separate one sealed bipolar cell 10 from an adjacent sealed bipolar cell 10. A layer of positive active material (PAM) 28 is deposited on the upper surface 20a of the bipolar plate 20. A layer of negative active material (NAM) 24 is deposited on the lower surface 20b of the bipolar plate 20. The depositions of PAM 28 and NAM 24 are made on the bipolar plate upper and lower surfaces 20a and 20b, respectively. The depositions are adjacent to a margin along the peripheral edges 20c of the bipolar plate 20. A glass mat separator 30, which is impregnated with a liquid or gelled electrolyte 32, is pressed between the layers of positive active material 28 and negative active material 24. An elastomer edge seal 31 is shown disposed between the bipolar plates 20 on the margin of the peripheral edges 20c. This edge seal 31 contains an upper and lower channel 26 through which gases that evolve during operation of the bipolar battery cell 10 can circulate between adjacent cells. This channel helps to maintain a uniform gas pressure in all cells and a uniform water vapor pressure. The edge seal 31 prevents liquid electrolyte 32 from escaping from the sealed bipolar cell 10. The edge seal 31 may also employ a gas escape channel 31a. Because of the inherent rigidity of the edge seal 31, it maintains a relatively constant separation distance between the bipolar plates 20. This rigidity also prevents the exertion of additional clamping force on the cell stack from providing a uniform, constant high pressure between the bipolar plates 20 and the separator 30.

FIG. 3 depicts a schematic cross-sectional view of a preferred embodiment of *Bipolar Battery Construction.*

FIG. 3 shows a bipolar battery 11 having a single bipolar battery stack assembly 48. FIG. 3 also reveals a method of clamping the battery stack assembly 48 together to produce the desired, uniform, constant pressure between the bipolar plate 20 and the separator 30 which comprise each bipolar battery cell 58. The battery stack assembly 48 is bounded by a first end plate 40 current collector and a second end plate 42 current collector. The battery stack assembly 48 is contained in a sealed container assembly 50. This assembly includes a first case seal 46 under a case flange 43 which is crimped over the upper end plate 40. The end plate 40 is fixed in position relative to the sealed container assembly 50 and provides electrical conduit between the battery stack assembly 48 and the external electrical terminal. Alternatively, the case flange 43 may be fastened to the first end plate 40 with metal fasteners, or may be both crimped and fastened, depending on the joint strength needed. The second end plate 42 bears against a plurality of calibrated springs 44 which supply the compression forces to the battery stack assembly 48 when the container assembly is completed by crimping over or fastening the case flange 43. Under the influence of spring loads produced by the calibrated springs 44, the end plates 40 and 42 produce a substantially uniform and constant, high compression force on the battery stack 48 and hence the separators 30. Each separator 30 is placed under a desired compressive loading, which may be on the order of 5 to 15 pounds per square inch. The crush resistance of the separator 30 is such that above a certain pressure, depending on the type of glass mat, its thickness is relatively insensitive to pressure. Under this condition of applied compression, the spacing between bipolar plates 20 remains nearly constant.

The spring-loaded end second plate 42 will move due to the expansion or contraction of the active materials in the battery stack assembly 48 or relaxation of the separator 30. In addition, ordinary manufacturing tolerances will cause a large variation in the total battery stack 48 height when a large number of bipolar cells are used. Both of these problems are inherent in the design and construction of conventional bipolar batteries having a predetermined case size. The present invention has a fixed case size, but accommodates dimensional changes in the battery stack 48 height. The present invention provides a means to conduct electrical current from the second end-plate 42 current collector to a terminal which extends outside the battery container assembly 50. This can be accomplished in several ways. In the preferred embodiment shown in FIG. 3, a terminal post slides within a second case seal 47. Alternatively, a wire or other flexible conductor may be used to connect a fixed terminal mounted on the container assembly 50 to the second end plate 42 current collector within the bipolar battery 11.

The single-stack bipolar battery 11 shown in FIG. 3 does not require rigid end sealing devices 21,22 as do conventional sealed bipolar battery cells 10. Rigid seals between cells 10 are normally used for the reasons discussed earlier. In a bipolar battery 11 & 12 without discreet edge seals 21, 22 the acid electrolyte 32 may "creep" or "wick" or "dribble" around the edges 20c of the bipolar plate 20. This creep can create an electrolyte short between PAM 28 and NAM 24 on the same bipolar plate 20. This results in self-discharge of cells and degradation of battery performance over time. There are two approaches to solving this problem:

1. Accept the self-discharge if it is within reasonable limits for the battery application; or
2. Interrupt or minimize the electrolyte leakage path around the bipolar plate edges 20c when self-discharge is not acceptable.

The electrolyte path between cells occurs by acid "wicking" or "creep" along the biplate surface 20a,20b,20c. This creep is due to capillary action through microscopic, crevices and grooves in the bipolar plate 20. If the plate is subject to corrosion, as is the case with lead plates, then the grooves are enlarged and porous corrosion products aid capillary action. Once the electrolyte 32 bridges the plate peripheral edges 20c, and connects the PAM to the NAM, self-discharge occurs by ion transfer through the electrolyte 32 path.

Tests conducted on lead plates indicate that the normal wicking may result in self-discharge rates which are acceptable. Several dozen twelve-volt, two ampere-hour batteries were constructed having plain lead plates without any edge seals. The cells were square with electrode areas of 48 cm$^2$ and a 1.8 cm wide border from the edge of the active material to the plate edge. The test batteries used the electrolyte paste composition described in U.S. patent application Ser, No. 08/096,676. In all of these batteries, the charging, discharging, capacity and float currents appear normal, The self-discharge was measured directly on one battery which was allowed to stand on open circuit for 38 days, then discharged to determine the remaining capacity. The results of the self-discharge tests are shown in Table 2.

TABLE 2

|  | AH (C/5) |
| --- | --- |
| Original Capacity | 2.45 |
| Capacity after 38 days | 1.47 |
| Capacity after one recharge | 2.18 |

The above data indicate that:
1. The self-discharge, even with a small electrode area, is not extremely rapid; on the order of 1% per day; and
2. The battery capacity recovers quickly, approximately 90% with the first recharge.

To determine the significance of this amount of selfdischarge, it is necessary to:
1. Determine the self-discharge for a practical size battery, which will have a greater ratio of electrode area-to-border; and
2. Compare this to other types of batteries. Extrapolating the results of the two ampere-hour batteries having 48 cm$^2$ area electrodes to a 32 ampere-hour battery having a 750 cm$^2$ electrode area, a one centimeter border and lead plates, the self-discharge comparison to other batteries which are candidates for electric vehicle application is shown in Table 3.

TABLE 3

SELF DISCHARGE COMPARISONS

| ARA SBLA Battery (No edge sealant, plain lead plates) | % Capacity Loss/Day* |
| --- | --- |
| Lab size (48 cm2 plate) | 1.1 |
| EV size (750 cm2 plate) | 0.5 |
| Other Candidate EV Batteries (Full Size Batteries/Cells) | |
| Lead Acid | 0.27 |
| Nickel Cadmium | 0.7 |
| Nickel Iron | 1.9 |
| Nickel Metal Hydride | 6.3 |
| Sodium Sulfur | >14** |

*averaged over test period, 30 days for SBLA, 7 days for others
**battery will "freeze up" in less than 7 days Table 3 reveals that the self-discharge of bipolar batteries may, in some circumstances be acceptable, even with lead biplates which corrode. The self discharge will be less for bipolar plates 20 which are fabricated from more corrosion resistant materials and/or employ peripheral edges 20c which resist electrolyte 32 creep. Such peripheral edges 20c must adhere tightly to the bipolar plate 20 surface, not corrode or oxidize, not be readily "wetted" by the electrolyte 32 and, preferably, be hydrophobic. While it is preferable that both the positive and negative sides of the bipolar plate 20 have the characteristics just described, it is only necessary that the electrolyte "wicking" path be broken. Therefore, only one side of the bipolar plate 20 need have hydrophobic peripheral edges 20c in many cases.

A number of materials can be used to construct the peripheral edges 20c, including plastics, Teflon™, waxes and epoxies. These can be applied in a variety of ways such as spraying, dipping, transfer printing and vapor deposition. In addition, certain metals may be applied to the peripheral edges, either as the border alone or in conjunction with the bipolar plate 20 surface coating such as described in U.S. patent application Ser. No. 08/096,118. These metals include tantalum and zirconium. Tantalum is suitable for coating only the positive side of the bipolar plate 20, because it becomes severely embrittled upon exposure to the hydrogen which appears on the negative side of the bipolar plate 20. Zirconium, while not quite as corrosion resistant and hydrophobic as tantalum, is suitable for coating both sides of the bipolar plate. Only a thin film ( about one micron thick) of these metals is required so they can be applied to the bipolar plate 20 by various vapor deposition techniques.

Other materials also may be used to coat the peripheral edges 20c of the bipolar plate 20. For example, glassy metal oxides may be applied by sol-gel techniques. With any of these edge coatings, current leakage can be greatly reduced or eliminated, thus further extending the useful time a battery can stand on open circuit before its capacity is significantly reduced.

Formation of electrolyte bridges between cells can also be prevented by use of an electrolyte dam 81. Should a separator 30 initially contain excess electrolyte 32 which is squeezed out when the separator 30 is placed under compression, the excess is contained by the dam 81.

Because each bipolar cell 10 is not enclosed by an edge seal 21,22,31 traditional methods of filling a bipolar battery 11, 12 with electrolyte 32 such as "fill and spill" or vacuum filling, can not be used. In the present invention, the addition of electrolyte 32 is accomplished by simply wetting each separator 30 and inserting it between the PAM 28 and the NAM 24 during cell stackup and assembly.

Figure 4A:
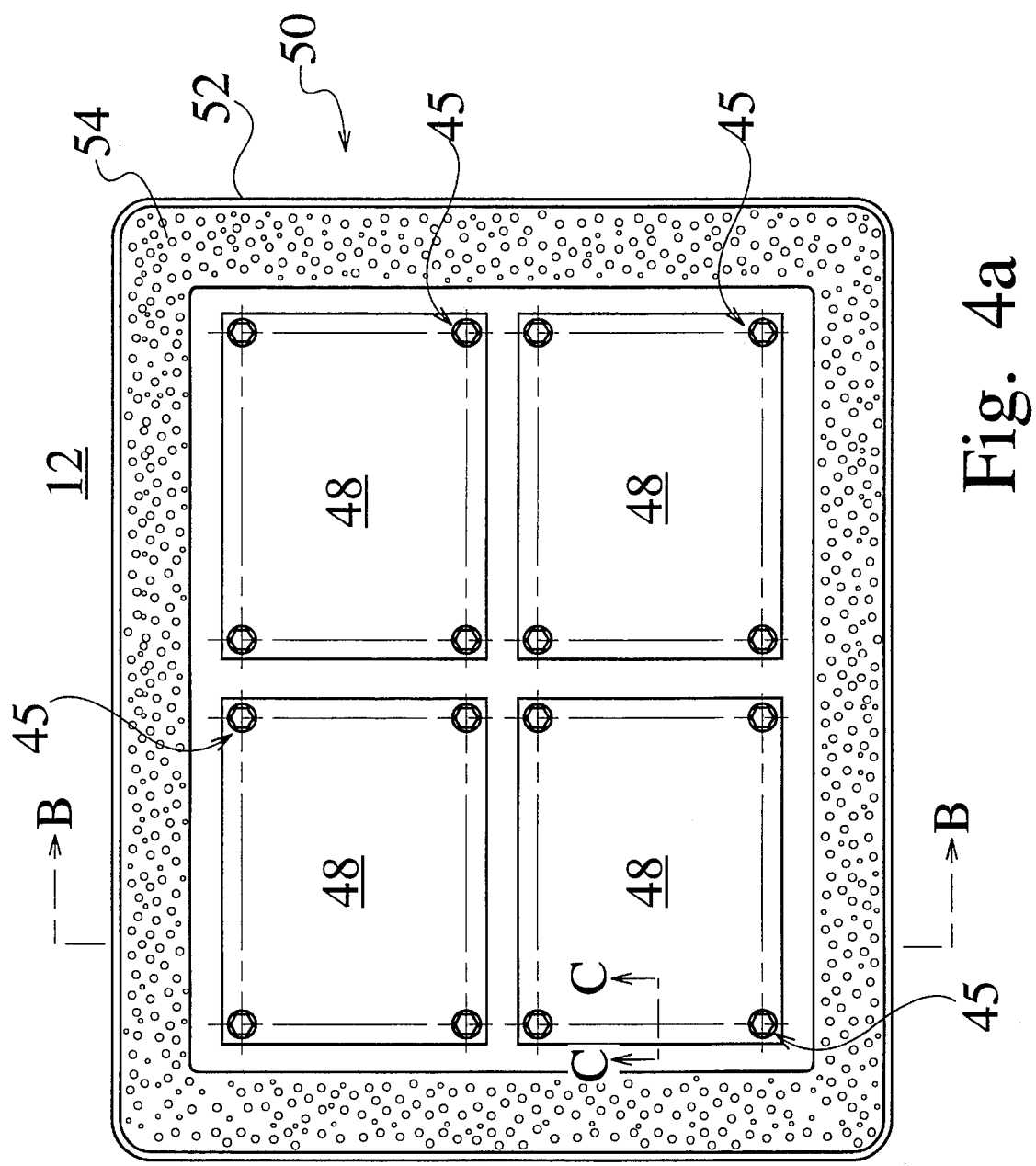
FIG. 4a is a schematic cut-away plan view of a bipolar battery using *Bipolar Battery Construction* methods, showing multiple battery stacks, one of the preferred embodiments of the present invention.

FIG. 4a depicts one of the preferred embodiments of the invention. This Figure illustrates a schematic cut-away, plan view, a multi-cell, bipolar lead-acid battery 12 having a plurality of bipolar battery stack assemblies 48. The battery stack assemblies 48 are enclosed in a sealed container assembly 50 which includes a gas-tight case 52. As an option, the case may be insulated by a foam insulator 54. The gas-tight case 52 prevents the loss of evolved gases and vapors which are therefore permitted to recombine, maintaining the liquid content of the electrolyte 32. The optional foam insulation 54 acts to maintain a uniform internal temperature of check battery and the battery stacks, particularly in cold weather. In one alternative embodiment, the battery stack assembly 48 is compressed by a plurality of compression clamp assemblies 45. These clamp assemblies are illustrated in FIG. 5c.

Figure 4B:
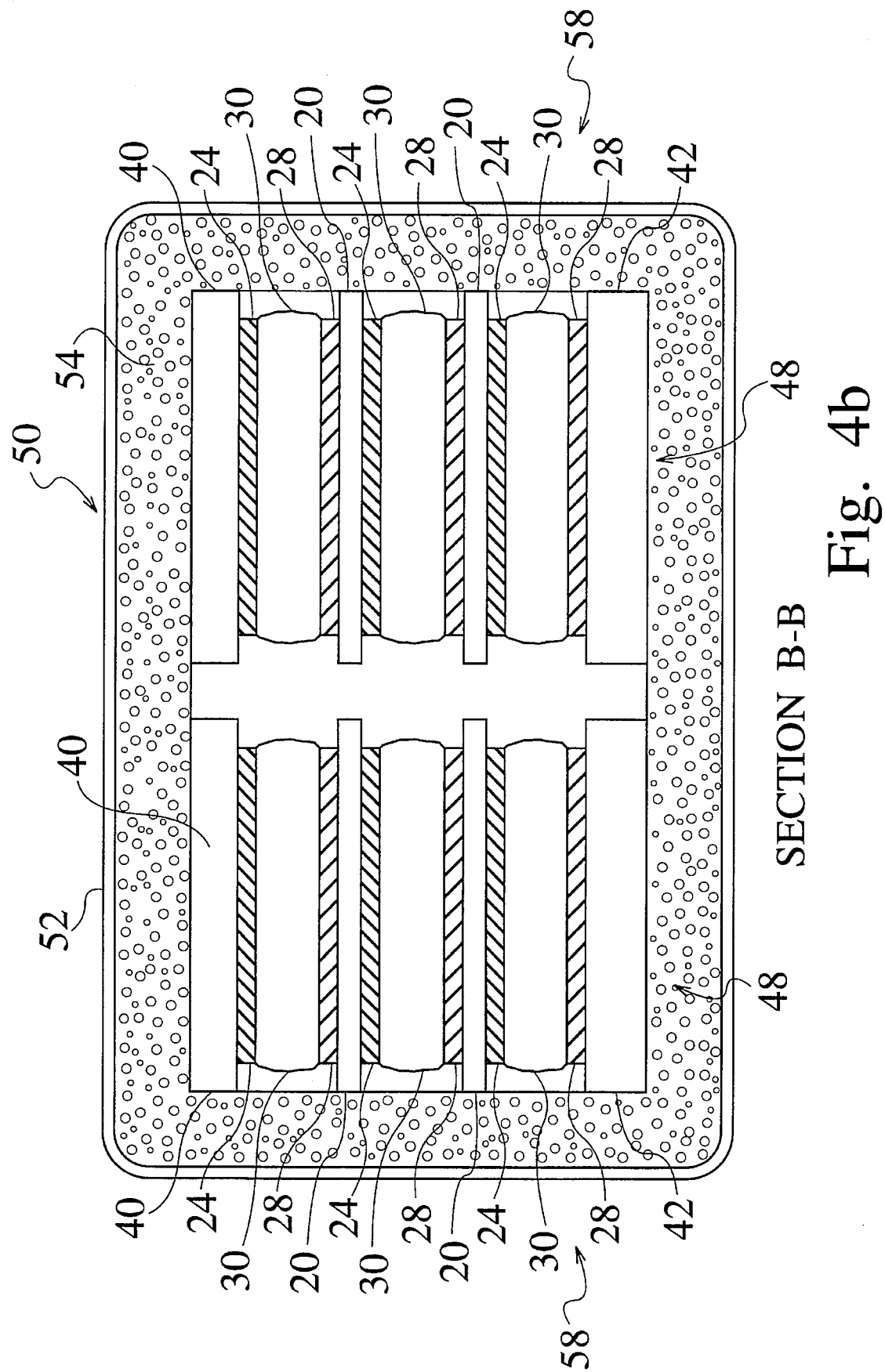

FIG. 4b depicts additional details of the preferred embodiment portrayed in FIG. 4a. FIG. 4b is a schematic cross-sectional view of FIG. 4a, Section B—B. In FIG. 4b, each battery stack assembly 48 is constructed from several layers of bipolar cells 58, and is bounded at an upper end by a first end plate 40 and at a lower end by a second end plate 42.

As stated earlier, use of commonly-manifolded battery cells has been successfully demonstrated. Because the negative electrode causes the recombination of oxygen and hydrogen into water faster when the electrode is dry, and high acid concentrations are more hygroscopic than low (diluted) concentrations, there are "self-regulating" mechanisms that will keep the bipolar cells 58 in equilibrium in a commonly-manifolded, sealed lead-acid battery, provided the cells 58 do not differ greatly in temperature. Accordingly, provisions must be made to assure the temperature of the cells 58 remains approximately uniform. This has been particularly challenging in a bipolar lead-acid battery 11 & 12 where the end cells 58 have a large surface area available/br heat transfer compared with cells 58 in the middle of the battery stack 48. In the present invention, elimination of temperature gradients is accomplished by insulating the end plates 40, 42 or the entire battery stack 48, for example with a foam insulation 54. Whereas insulating the entire battery stack 48 will cause an increase in operating temperature, this has been shown to be beneficial to power, energy and battery life up to a temperature of approximately 150 degrees Fahrenheit.

Figure 5B:
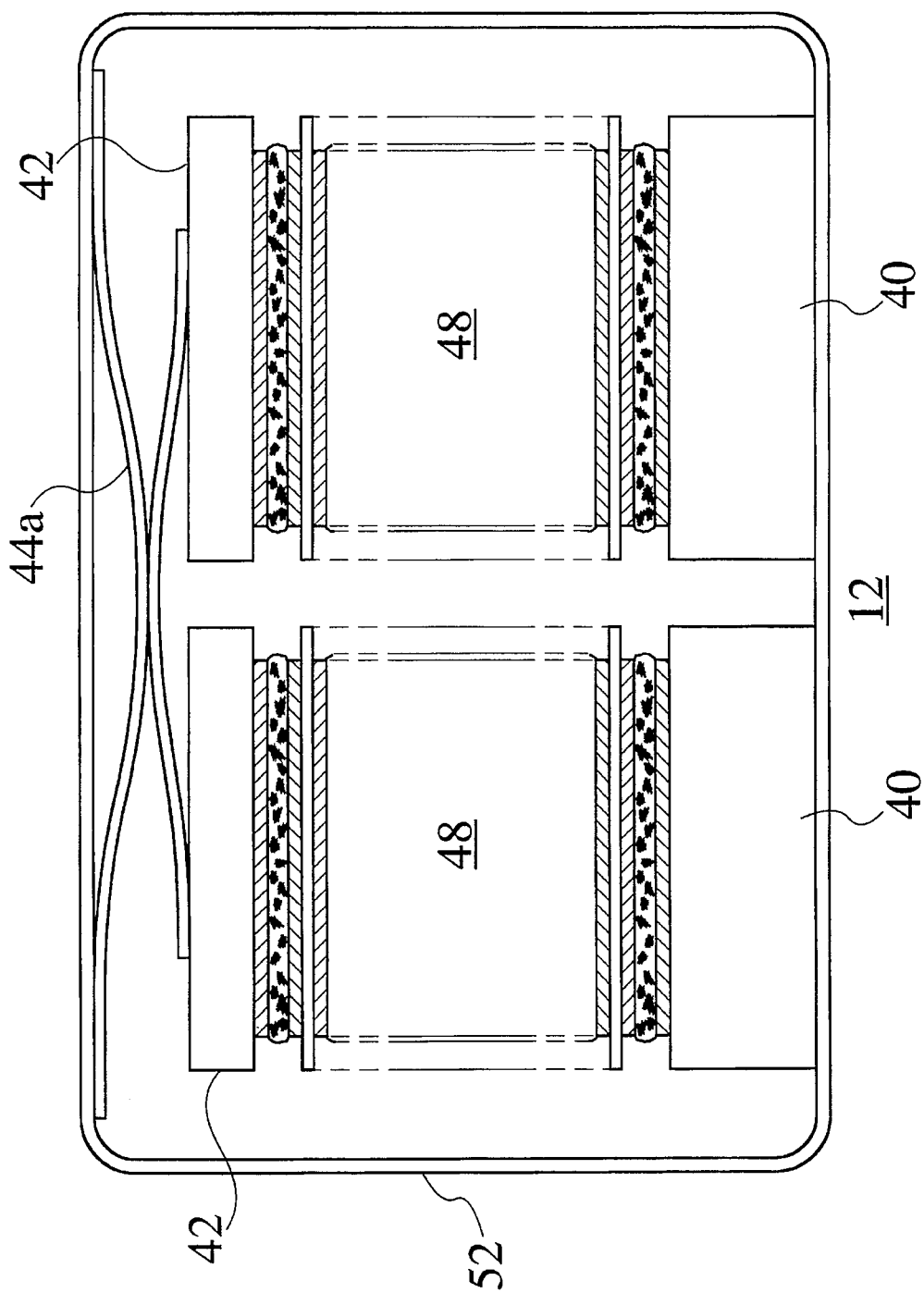
FIG. 5b is a schematic cross-sectional view of the Multi-Cell Battery using *Bipolar Battery Construction* depicted in FIG. 4a, showing an alternate method for providing uniform high pressure to the bipolar battery stacks, using a fiberglass leaf spring.
Figure 5C:
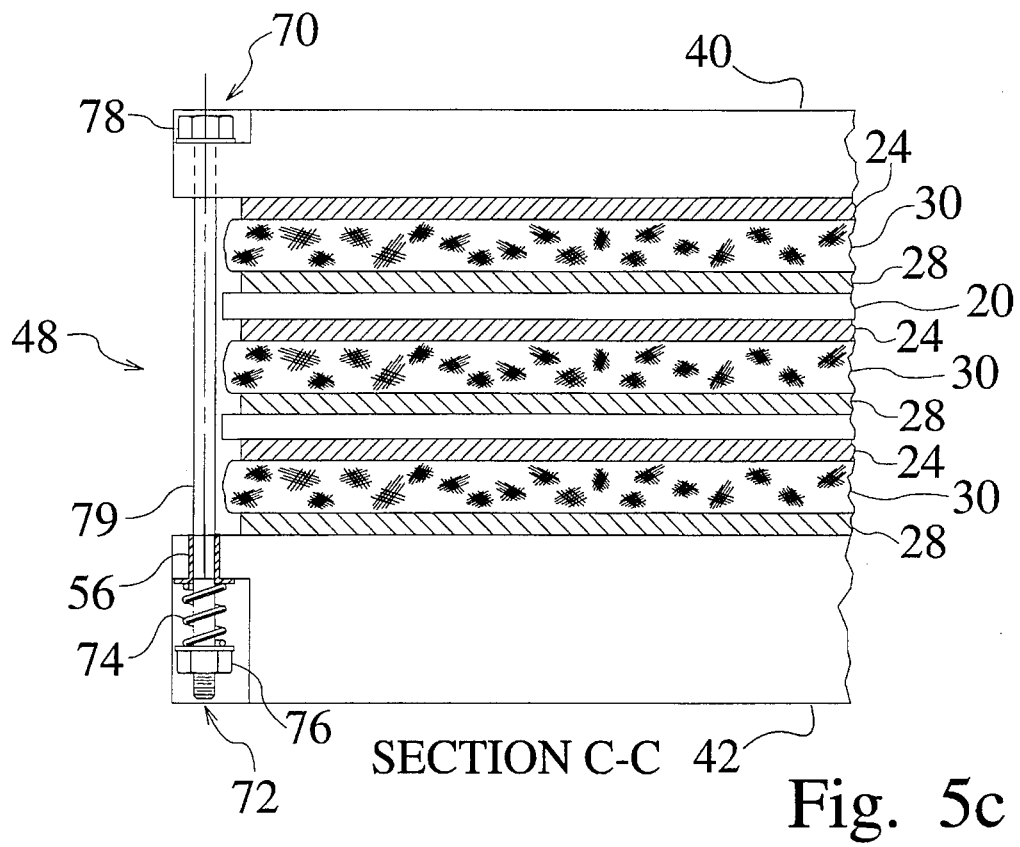
FIG. 5c is a schematic cross-sectional view C—C of the Multi-Cell Battery using *Bipolar Battery Construction* depicted in FIG. 4a, showing one of the preferred methods of applying desired, uniform, constant pressure between each bipolar plate and the separators in each of the bipolar battery stacks.

FIGS. 5a and 5b depict several methods of applying the desired, uniform, constant pressure to each battery stack assembly 48 with calibrated springs 44 or leaf springs 44a. These springs supply the desired compressive force to the battery stack assembly 48. A multi-stack bipolar lead-acid battery 12 is depicted which has calibrated springs 44 and 44a compressed between the case 52 and the second end plate 42 after the case assembly 50 has been closed and sealed. The calibrated springs 44 and 44a may be coil springs 44 or, alternatively, leaf springs 44a composed of fiberglass or metal.

Corrosion of the calibrated springs 44 and 44a can be delayed or eliminated by use of one of several devices:
1. Long "creep" or "wicking" paths;
2. Hydrophobic materials on the "creep" path between the calibrated springs 44 and 44a and the separator 30;
3. Springs coated with corrosion-resistant material, such as Teflon™; or
4. Corrosion resistant spring material, such as fiberglass.

FIG. 5c is a schematic cross-sectional view of FIG. 4a, Section C—C. The compression clamp assemblies 45 in this embodiment includes a series of threaded bolts 72. Each bolt head 78 bears on the first end plate 40. Each bolt grip 79 passes through the first end plate 40, second end plate 42 and through a calibrated spring 74 which bears against the second end plate 42. Each bolt grip 79 has an electrical insulating surface to prevent short circuits between end plates 40, 42 or bipolar plates 20. A nut 76 is threaded onto the bolt and against the spring 74 to adjust the compression force to the desired amount. Under the influence of spring loads produced by the compression clamp assemblies 45, the end plates 40, 42 produce a uniform and constant, high compression force on the battery stack 48, and hence the separators 30. If the end plates 40, 42 are made from conductive materials, an insulated bushing 56 or insulated bolt grip 79 surfaces may be required.

Figure 6:
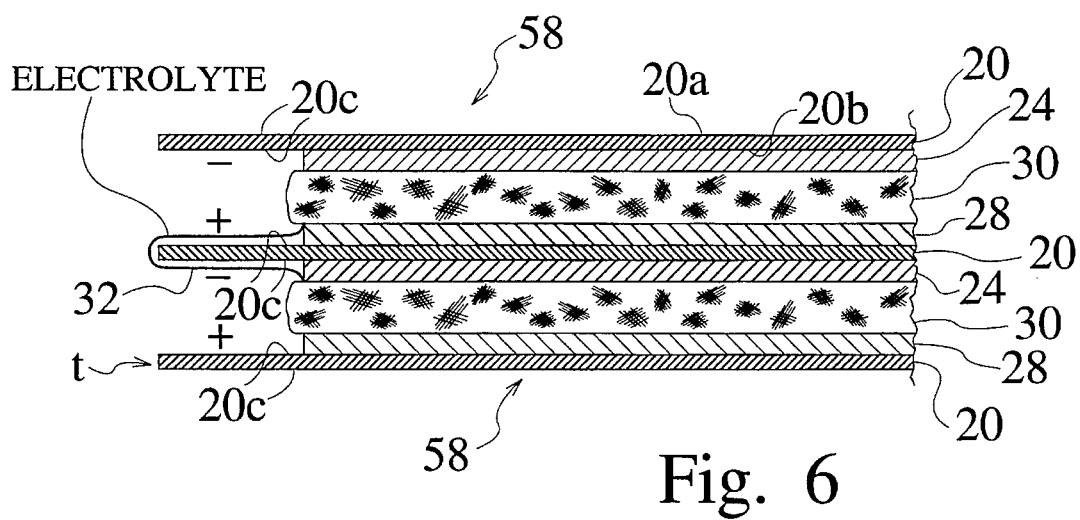
FIG. 6 is a schematic cross-sectional view of a portion of a battery stack showing an embodiment of the present invention in which two adjacent bipolar battery cells exhibit leakage current caused by electrolyte creeping along the peripheral edges of a bipolar plate separating the battery cells, which is acceptable in some applications.

FIG. 6 shows a schematic cross-sectional view of unsealed bipolar battery cells 58 which are part of the battery stack assembly 48. In a bipolar battery cell 10 where the separator 30 is a fine glass mat which confines the electrolyte 32, such as described in U.S. Pat. No. 4,539,268, capillary forces tend to absorb and hold the electrolyte 32. There remain, however, additional forces tending to make the electrolyte 32 wick or creep along the surfaces 20a,20b,20c of the bipolar plate 20 in a continuous, conductive sheet until the electrolyte 32 bridges to the adjacent bipolar cell 58.

FIG. 6 depicts a bipolar cell 58 without any inhibitor to reduce or eliminate electrolyte 32 "creep". It shows the electrolyte 32 bridging across adjacent bipolar cells 58 when conventional, rigid edge seals 21,22 and 31 are not present. The bridge causes a leakage current to flow between the positive active material 28 and the negative active material 24 which, if excessive, will cause unacceptable rate of self-discharge of the unsealed bipolar cells 58 involved. As discussed above, a perfect edge seal is not required in the *Bipolar Battery Construction* disclosed in this invention. It is only necessary to provide for a minimum leakage current. Under conditions of no load drawing current from it, a conventional lead-acid battery can have a loss of 0.1% to 0.3% capacity per day in the first month after charging. With no load drawing current, other advanced batteries under development can have losses of 0.6% to 7% per day. Thus, minimum leakage current will result in an acceptable rate of discharge as described above. When the embodiment of bare peripheral edges 20c of the bipolar plate 20 as shown in FIG. 6 has acceptable leakage current, no further device is necessary to reduce the electrolyte 32 creep. Where such leakage is unacceptable, the present invention offers a number of alternative "creep" or "wicking" inhibiting devices to conventional seals 21,31 to minimize leakage current.

Figure 7A:
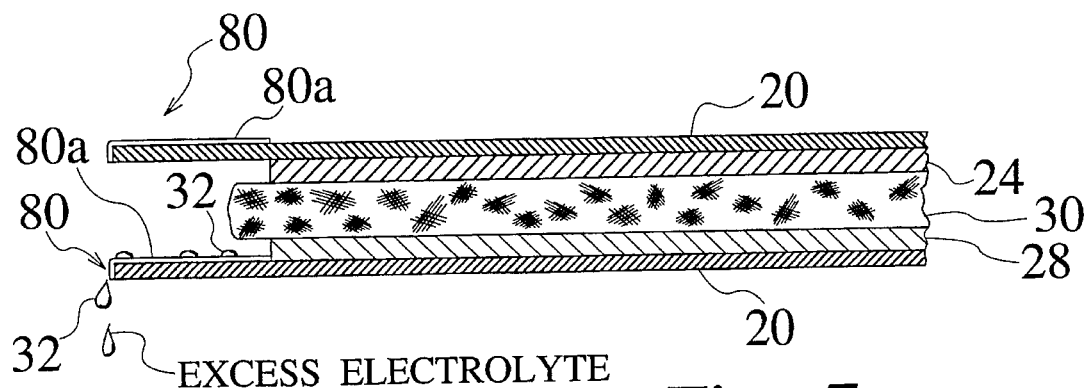
FIG. 7a is a schematic cross-sectional view of a portion of a *Bipolar Battery Construction* showing one of the preferred embodiments used when leakage current between cells is unacceptable. This figure reveals liquid-repelling, tantalum coated peripheral edges of bipolar plates.

FIG. 7a shows one preferred embodiment of the present invention which keeps the leakage current between adjacent bipolar cells 10 at a negligible level. In this embodiment, a layer of tantalum 80a is coated or vapor deposited onto the peripheral edges 20c on the positive side 20a and thickness t of the bipolar plate 20. The tantalum coating surface is non-wetting, or liquid-repellant, and the liquid electrolyte 32 "beads up" into droplets which roll off the surface. The excess electrolyte 32 is unable to escape from the sealed battery case 52. In alternative embodiments, the tantalum coating 80a may be replaced by other "hydrophobic" coatings such as Teflon™, wax, polyethylene, or glassy metal oxides. These coatings may be applied on the peripheral edges 20c and thickness t of the bipolar plate 20. In some alternative embodiments, it would be adequate to simply coat an upper surface 20a or lower surface 20b, or one peripheral edge 20c.

Figure 7B:
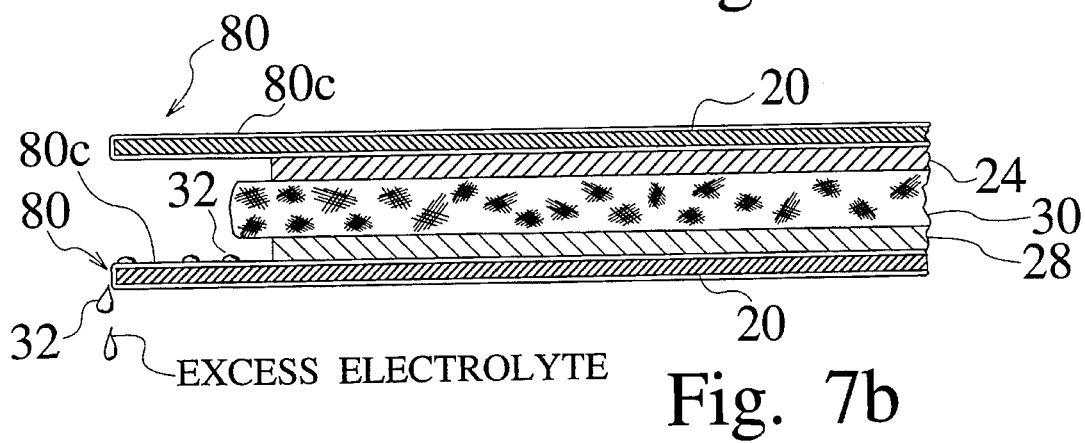
FIG. 7b is a schematic cross-sectional view of a portion of a *Bipolar Battery Construction* showing another one of the preferred embodiments a liquid repelling, zirconium coating of both sides of a bipolar plate.

In other alternative embodiments, such as that shown in FIG. 7b, a zirconium coating 80c may be applied to the entire surfaces 20a, 20b, 20c and thickness t of the bipolar plate 20.

Figure 8:
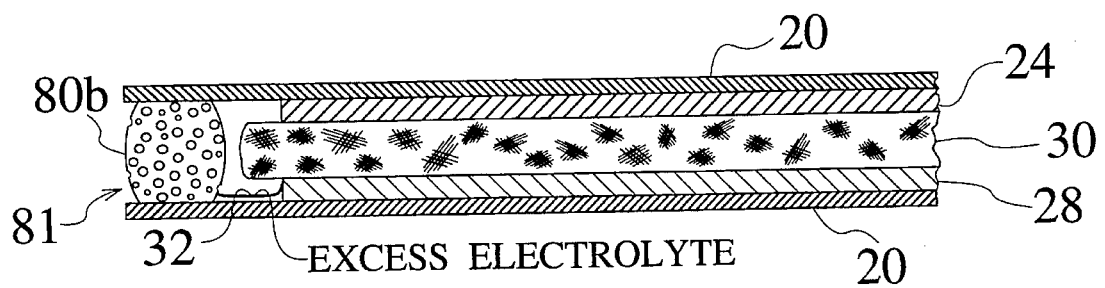
Figure 9:
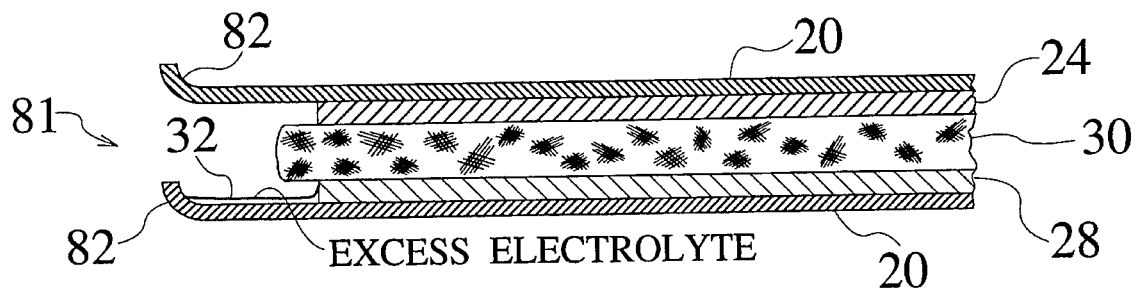
Figure 10A:
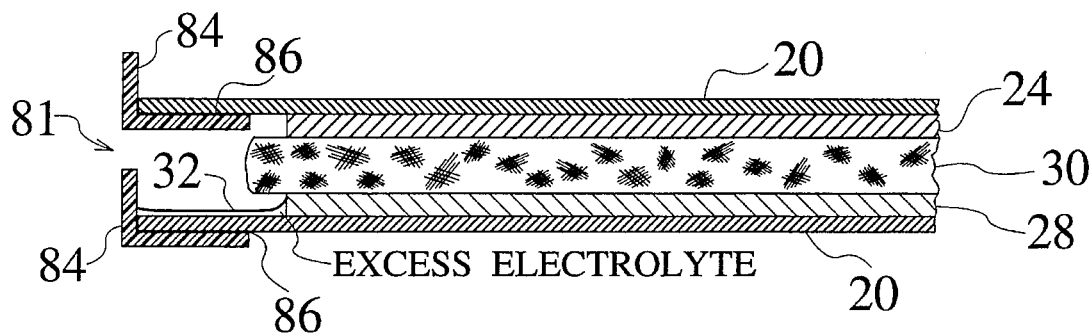
Figure 10B:
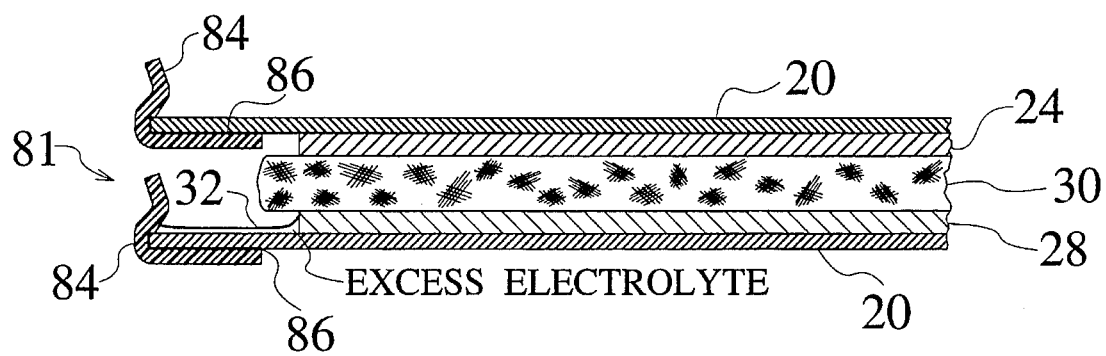

FIGS. 8, 9, 10a, 10b and 11 depict alternative embodiments of an electrolyte dam 81 which minimizes or eliminates electrolyte 32 bridging between adjacent unsealed bipolar cells 58. The dam 81 helps to keep leakage current at an acceptable level. FIG. 8 shows a flexible sponge 80b made of a hydrophobic material installed on the peripheral edges 20c of an unsealed bipolar cell 58. The flexible sponge 80b acts as an electrolyte dam 81, but allows evolved gases to circulate freely in the sealed battery case 52. The flexible sponge 80b presents no appreciable resistance to the compressive loads on the separator 30. Other forms of electrolyte dam 81 shown in FIGS. 9, 10a, 10b and 11 are:
1. Upturned peripheral edges 82 of the bipolar plate 20;
2. A continuous plastic rim 84 bonded with adhesive 86 to the peripheral edges 20c of the bipolar plate 20; As an alternative, the plastic rim 84 may be formed to snap onto the peripheral edges 20c as shown in FIG. 10b; and
3. Flexible, continuous hydrophobic beads 88 affixed to the thickness t and peripheral edges 20c on both the upper surface 20a and the lower surface 20b of bipolar plate 20.

In the cases shown in FIGS. 7 through 11, gases are allowed to circulate in the sealed, gas-tight case 52, but the electrolyte 32 is prevented from wicking or creeping between adjacent unsealed bipolar cells 58.

Although the present invention has been described in detail with reference to particular preferred embodiments, persons possessing ordinary skill in the art to which this invention pertains will appreciate that various modifications and enhancements may be made without departing from the spirit and scope of the claims that follow.

LIST OF REFERENCE NUMERALS

Figure 11:
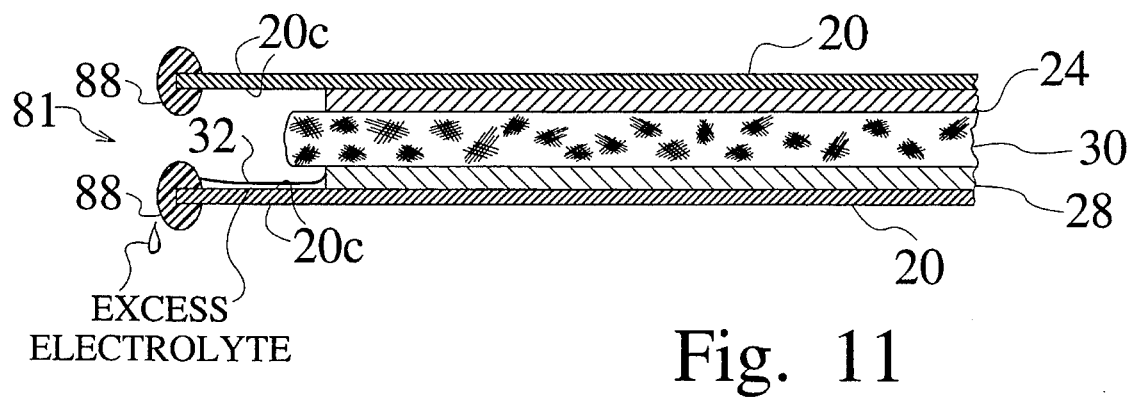

FIG. 1c
10 Sealed bipolar battery cell
20 Bipolar plate
20a Bipolar plate upper surface
20b Bipolar plate lower surface
20c Bipolar plate peripheral edges
21 Rigid plastic edge seal
22 Seal area
24 Negative active material (NAM)
28 Positive active material (PAM)
30 Separator with electrolyte
FIG. 2a
10 Sealed bipolar battery cell
20 Bipolar plate
31 Elastomeric edge seal
FIG. 2b
20 Bipolar plate
20a Bipolar plate upper surface
20b Bipolar plate lower surface
20c Bipolar plate peripheral edges
24 Negative active material (NAM)
28 Positive active material (PAM)
30 Separator with electrolyte
31 Elastomeric edge seal
31a Gas escape channel
t Bipolar plate thickness
FIG. 3
11 Single-stack Bipolar lead-acid battery
20 Bipolar plate
24 Negative active material (NAM)
28 Positive active material (PAM)
30 Separator with electrolyte
40 First end plate
42 Second end plate
43 Case flange
44 Calibrated springs
45 Compression springs
46 First case seal
47 Second case seal
48 Battery stack assembly
50 Container assembly
54 Insulation
58 Bipolar battery cell
FIG. 4a
12 Multi-stack bipolar lead acid battery
45 Compression clamp assembly
48 Battery stack assembly
50 Container assembly
52 Sealed case
54 Insulation
FIG. 4b
20 Bipolar plate
24 Negative active material (NAM)
28 Positive active material (PAM)
30 Separator with electrolyte
40 First end plate
42 Second end plate
48 Battery stack assembly
50 Container assembly
58 Unsealed bipolar battery cell
52 Sealed case
54 Insulation
FIG. 5a
12 Multi-stack bipolar lead-acid battery
40 First end plate
42 Second end plate
44 Calibrated springs
48 Battery stack assembly
50 Container assembly
52 Sealed case
FIG. 5b
12 Multi-stack bipolar lead-acid battery
40 First end plate
42 Second end plate
44a Fiberglass leaf spring
48 Battery stack assembly
50 Sealed case
FIG. 5c
20 Bipolar plate
24 Negative active material
28 Positive active material
40 First end plate
42 Second end plate
45 Compression clamp assembly
48 Battery stack assembly
56 Insulated bushing
72 Threaded bolt
74 Calibrated spring
76 Threaded nut
78 Bolt head
79 Bolt grip
FIG. 6
20 Bipolar plate
20a Bipolar plate upper surface
20b Bipolar plate lower surface
20c Bipolar plate peripheral edges
22 Seal joint margin
24 Negative active material (NAM)
28 Positive active material (PAM)
30 Separator with electrolyte
32 Electrolyte
58 Unsealed bipolar battery cell
FIG. 7a
20 Bipolar plate
24 Negative active material (NAM)
28 Positive active material (PAM)
30 Separator with electrolyte
32 Electrolyte
80 Hydrophobic (non-wetting) surface
80a Tantalum coating
FIG. 7b
20 Bipolar plate
28 Positive active material (PAM)
30 Separator with electrolyte
32 Electrolyte
80 Hydrophobic (non-wetting) surface
80c Zirconium coating
FIG. 8
20 Bipolar plate
24 Negative active material (NAM)
28 Positive active material (PAM)

30 Separator with electrolyte
32 Electrolyte
81 Electrolyte dam
80b Hydrophobic sponge
FIG. 9
20 Bipolar plate
24 Negative active material (NAM)
28 Positive active material (PAM)
30 Separator with electrolyte
32 Electrolyte
81 Electrolyte dam
82 Upturned peripheral edge
FIG. 10a
20 Bipolar plate
24 Negative active material (NAM)
28 Positive active material (PAM)
30 Separator with electrolyte
32 Electrolyte
81 Electrolyte dam
84 Continuous rim
86 Adhesive
FIG. 10b
20 Bipolar plate
24 Negative active material (NAM)
28 Positive active material (PAM)
30 Separator with electrolyte
32 Electrolyte
81 Electrolyte dam
84 Continuous snap-on rim
FIG. 11
20 Bipolar plate
20c Bipolar plate peripheral edges
24 Negative active material (NAM)
28 Positive active material (PAM)
30 Separator with electrolyte
32 Electrolyte
81 Electrolyte dam
88 Plastic bead
t Bipolar plate thickness

What is claimed is:

1. A lead-acid battery apparatus for producing electrical energy, comprising:

a battery stack including a plurality of bipolar cells, said battery stack being bounded at one end by a first end plate current collector and an opposite end by a second end plate current collector, said second end plate current collector being of opposite polarity to said first end plate current collector;

each of said plurality of bipolar cells including two bipolar plates, each having an upper surface, a lower surface, peripheral edges, and a thickness; said upper surface coated to an area adjacent said peripheral edges with a positive active material and said lower surface coated to adjacent said peripheral edges with a negative active material;

a separator including an absorbed electrolyte separating said positive active material from said negative active material, said peripheral edges defining an open cavity each of said plurality of bipolar plates coated with an inhibitor which inhibits leakage current through said electrolyte bridging between any two of said plurality of bipolar cells generally adjacent;

a compression element having a plurality of threaded bolts, a plurality of calibrated springs and a plurality of threaded nuts, a head of each of said threaded bolts bearing on said first end plate and a grip of each one of said threaded bolts passing axially adjacent said battery stack and through one of said calibrated springs, a first end of said calibrated springs bearing on said second end plate in opposition to said head and each of said nuts being threaded against a second end of each of said calibrated springs, creating the pressure by compressing said calibrated springs;

said compression element being disposed internally in said lead-acid battery apparatus, operating to apply a substantially uniform pressure on each one of said plurality of bipolar places and each said separator in each of said plurality of bipolar cells; and a container having a gas-tight case which prevents escape of gas, vapor and liquid, operating to confine said battery stack and said compression element.

2. An apparatus as claimed in claim 1 in which said inhibitor comprises a surface coating of tantalum disposed upon said upper surface, and upon said thickness (t) of each one of said plurality of bipolar plates.

3. An apparatus as claimed in claim 1 in which said inhibitor comprises a surface coating of zirconium disposed upon said upper surface, upon said lower surface and upon said thickness (t) of each one of said plurality of bipolar plates.

4. An apparatus as claimed in claim 1 in which said inhibitor comprises a hydrophobic surface coating (80a) disposed upon said plurality of peripheral edges and upon said thickness (t) of each one of said plurality of bipolar plates.

5. An apparatus as claimed in claim 1 in which said inhibitor comprises an electrolyte dam.

6. An apparatus as claimed in claim 4 in which said hydrophobic surface coating is Teflon™.

7. An apparatus as claimed in claim 4 in which said hydrophobic surface coating is wax.

8. An apparatus as claimed in claim 4 in which said hydrophobic surface coating is a glassy metal oxide.

9. An apparatus as claimed in claim 4 in which said hydrophobic surface coating is polyethylene.

10. An apparatus as claimed in claim 5 in which said electrolyte dam comprises a continuous hydrophobic sponge disposed upon said plurality of peripheral edges of each one of said plurality of bipolar plates.

11. An apparatus as claimed in claim 5 in which said electrolyte dam comprises an upturned edge of each of said plurality of peripheral edges of each one of said plurality of bipolar plates.

12. An apparatus as claimed in claim 5 in which said electrolyte dam comprises a continuous rim disposed on each of said plurality of peripheral edges of each one of said plurality of bipolar plates.

13. An apparatus as claimed in claim 5 in which said electrolyte dam comprises a flexible, continuous hydrophobic bead, said flexible, continuous hydrophobic bead being affixed to each of said plurality of peripheral edges and said thickness (t) of each one of said plurality of bipolar plates.

14. A bipolar battery apparatus, comprising:

a housing, defining internal surfaces with a gas-tight chamber, said housing also defining a first electrode area and a second electrode area;

a stack of bipolar battery elements, said bipolar battery elements including a plurality of bipolar battery assemblies, each including a bipolar plate, a positive active material, a separator material and a negative active material, a first surface of said stack bounded by a non-movable member which defines said first terminal and is electrically connected to said first terminal, said non-movable member being fixed relative to said housing such that it cannot move relative to said housing; and a second biasing element, defining a surface which biases a second, opposite side of said battery plates, said second biasing element including a compression element which allows said second element to move relative to said housing, said second element pressing against said second surface by a predetermined amount to press said second surface relative to said non movable member.

15. Apparatus as in claim 14 wherein said gas tight chamber includes a moving seal around said second electrode area, said moving seal allowing said second terminal to move relative to said case.

16. Apparatus as in claim 14 wherein said plate includes at least one spring element, pressing against a pressing surface, said pressing surface pressing against one of said positive active material and said negative active material.

17. A bipolar lead-acid battery comprising:

a housing having internal surfaces defining a closed chamber, having a gas-tight case which prevents escape of gas, vapor and liquid therefrom;

a plurality of bipolar battery cells; said plurality of bipolar battery cells arranged in a battery stack in said housing; each of said bipolar battery cells assembled in layers in said battery stack;

a first surface, coupled against a first surface of the battery stack, said first surface being immovable;

a fixed terminal connected to said first surface;

a second compression surface, including a bias surface biasing against said housing, said second surface being movable and pressing against a second surface of said battery stack; and a movable terminal, connected to said second surface, said movable terminal further including a sliding gas type connection to prevent gas from escaping from said housing when said second surface is moved.

* * * * *